United States Patent [19]

Hexel

[11] 3,944,124
[45] Mar. 16, 1976

[54] PLASTIC CONTAINERS

[75] Inventor: Gunter Hexel, Braunschweig, Germany

[73] Assignee: Schmalbach-Lubeca-werke AG, Braunschweig, Germany

[22] Filed: July 24, 1972

[21] Appl. No.: 274,401

[30] Foreign Application Priority Data
July 28, 1971 Germany............................ 7128947

[52] U.S. Cl................................ 229/1.5 B; 220/72
[51] Int. Cl.² ..................... B65D 25/00; B65D 1/44
[58] Field of Search ..................... 229/1.5 B; 220/72

[56] References Cited
UNITED STATES PATENTS

| | | | |
|---|---|---|---|
| 2,603,177 | 7/1952 | Gardiner | 220/72 |
| 2,787,397 | 4/1957 | Radford | 220/72 |
| 2,799,435 | 7/1957 | Abplanalp | 220/72 |
| 3,050,773 | 8/1962 | Hagen | 215/1 R |
| 3,169,688 | 2/1965 | Schad | 229/1.5 B |
| 3,194,468 | 7/1965 | Baron | 220/72 |
| 3,357,593 | 12/1967 | Sears | 220/72 |
| 3,495,736 | 2/1970 | Ragetti | 220/72 |
| 3,543,963 | 12/1970 | Heisler | 220/72 |
| 3,836,063 | 9/1974 | Sutch | 220/72 |

FOREIGN PATENTS OR APPLICATIONS

| | | | |
|---|---|---|---|
| 1,038,897 | 8/1966 | United Kingdom | 220/72 |
| 736,313 | 6/1966 | Canada | 220/72 |

*Primary Examiner*—George E. Lowrance
*Attorney, Agent, or Firm*—Murray Schaffer

[57] ABSTRACT

A cup-shape container of relatively thin plastic material having non-sinuous or non-corrugated body wall provided with reinforcing zones extending at least in part with a directional component adapted to intersect the upper open edge or lip, and having a width substantially less than the remaining wall areas.

1 Claim, 9 Drawing Figures

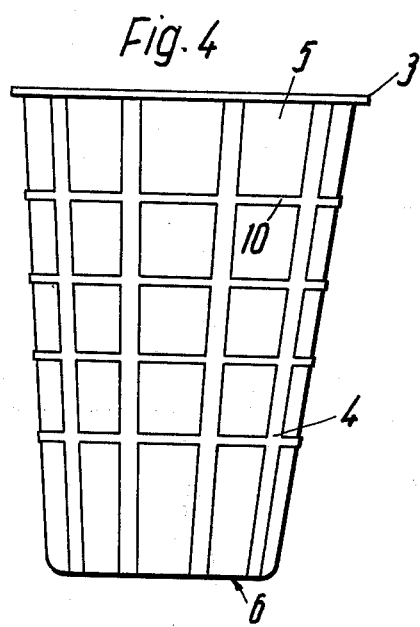
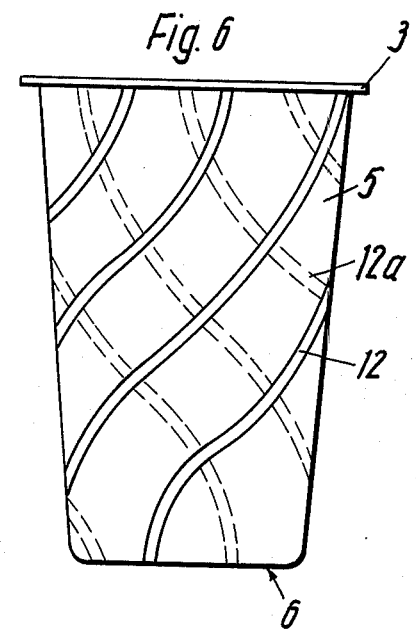
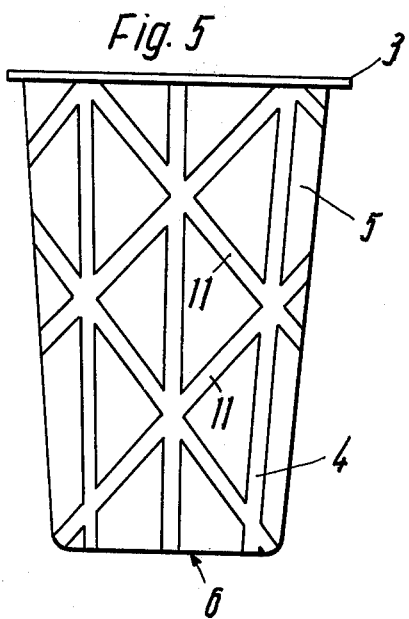
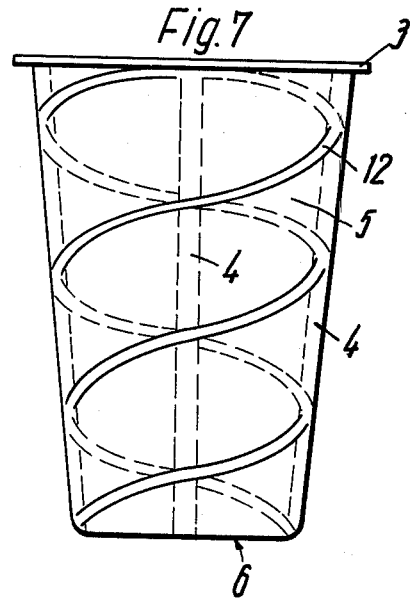
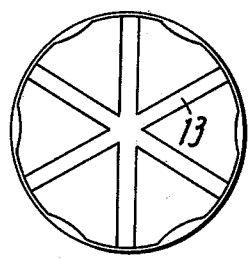
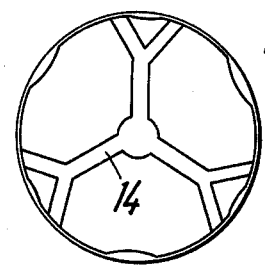

PLASTIC CONTAINERS

BACKGROUND OF INVENTION

The present invention relates to an open ended, cup-shaped container made from plastic material and adapted for use as a cream, yogurt, milk or similar liquid container. Particularly, the present invention relates to a plastic container made for example by injection molding, provided with a unitary conical or cylindrical body closed at its bottom and having a variable thickness in selected areas of its wall. The body may be also provided with a circumferential flange lip about its open end to which a cover or foil may be attached.

In the mass production of plastic cups such as those described above, it is most desireable to maintain the material usage as small as possible. For this reason, efforts are made to mold the walls of the cup from thin material and provide the same with sufficient stiffness by the use of corresponding corrugated profiles so that the wall thickness compared with smooth wall cups can be reduced, while the strength retained.

Cups are known in this art by which the peripheral wall is formed with alternate and substantially parallel inner and outer longitudinal ribs and lengthwise indentations in either horizontal or vertical orientation. These ribs form a corrugated or undulating surface, the crests, backbone or crown of the ribs serving as gripping surfaces by which the cup may be picked up or handled. Because of the manipulation of the body walls in the formation of the ribs, a very thin material cannot be used for the basic structure. It has, therefore, become known, to form the crown or crest of the ribs, on at least one side of the container wall, with a reinforcement, as for example, an increase in material thickness, or by the insertion of an additional member to make it stronger. Cups made with profiled peripheral walls and reinforced ribs, permit some saving in material particularly over those earlier cups having smooth thicker walls. However, because the corrugations subject the wall surface to distention and enlargement, if viewed in a planar development, and because material spills or flows over into adjacent portions of the remaining peripheral wall areas, the actual savings in material is virtually insignificant.

It is an object of the present invention to provide a complete plastic cup-like container having substantial material savings over the prior products without any reduction in strength.

Further objects and disadvantages will be seen from the following disclosure of the present invention.

SUMMARY OF INVENTION

According to the present invention a cup-shape container is provided of relatively thin plastic material having on its body wall non-sinuous or non-corrugated reinforcing zones extending at least in part with directional component adapted to intersect the upper open edge or lip, and having a width substantially less than the remaining wall areas.

The exact form of the reinforced wall zones can be obtained in numerous ways. In one embodiment the zones extend in strips at least in part from the bottom to the upper open edge and they can thus be formed on either or both the inner or outer face of the wall.

In another embodiment, the reinforcing wall zones run partially straight to the lip or edge and partially angular thereto and are joined one to another where they intersect. In this embodiment the zones take on waffle or woven-like configuration wherein the areas between the reinforcing zones are substantially larger than the reinforcing zones themselves.

In still another embodiment at least some of the reinforcing zones are curved, and extend screw-like about the wall, crisscrossing over each other. This arrangement may be also combined with vertical reinforcing zones.

The reinforcing members, in cross section, are formed so that they blend into the adjacent wall portions of the cup, in a stepless or continuous manner to make a smooth transition between reinforcing zone and wall. Thus, the injection molding of the container, from any suitable plastic, such as P.V.C., polyeurathane, polypropolene etc., can be made easily. The material flows between the sections so that a uniform density is obtained in a unitary body even though the wall has varying thicknesses. Furthermore, the tapered transition between reinforcing zones and intermediate zones permits further reduction in the use of material, as well as simplification of the mold.

It is further preferred that the reinforcing members, extend below the sides or wall of the cup to the bottom, forming reinforcing zones therein, and extend like spokes, radially from the center of the bottom. The bottom reinforcing zones are similar in form to those used on the side wall.

Through the non-undulating formation of the body wall considerable material savings are obtained over known containers having corrugated or rippled reinforced ribs. Smooth wall areas of large size can be formed of substantial thin material, yet the reinforcing zones provide the necessary rigidity. The actual savings of the invention are significantly greater, since the amount of material saved in the smooth areas far exceeds that used in the reinforcing zones. Furthermore, a biaxial flow of plastic material occurs through the arrangement of reinforcing zones having a directional component with respect to the opening edge, so that during the manufacturing process a higher degree of strength and physical orientation of the plastic, is obtained. In this manner very thin intermediate areas between reinforcing zones can be made. It has been found that savings of even higher than 30% in material alone can be obtained by forming cups in accord with the present invention. The cups are stronger and lighter in weight and can therefore be shipped and stored more economically and easier.

The thickness of each section in the wall and the bottom should be selectively apportioned so that the areas which are not reinforced are less than one half (½) the thickness of the reinforced zones. In particular, for example, a very satisfactory yogurt or cream cup has been formed with a wall thickness of 0.3 millimeters and in the reinforced zones of a thickness of 0.7 millimeters. Such a container has the desired strength, and exhibits an unexpected increase in temperature stability, maintaining the contents at the desired degree of temperature over longer periods than heretofore known containers.

Full details of the present invention are given in the following disclosure and are shown in the attached drawings.

BRIEF DESCRIPTION OF THE DRAWINGS

In the drawings:

FIGS. 4–7 are side elevational views of containers showing respectively four additional embodiments of the present invention; and FIGS. 8 and 9 show bottom plan views of containers illustrating the application of the present invention to the formation of container bottoms.

DESCRIPTION OF THE INVENTION

Figure 2:
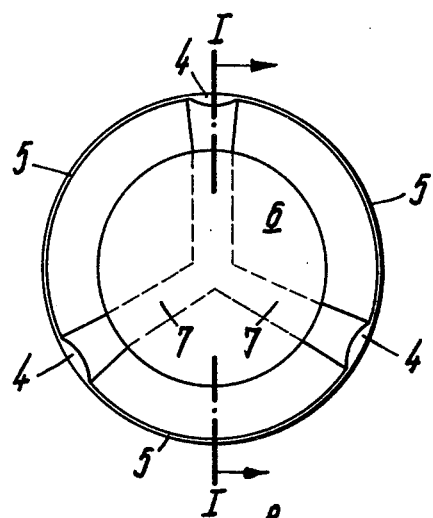
FIG. 2 is a sectional view looking down on the container as taken along lines 2—2 of FIG. 1.
Figure 1:
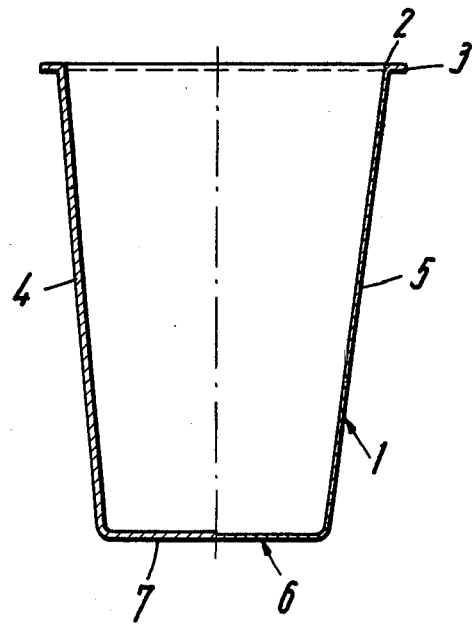
FIG. 1 is a vertical sectional of a container taken along lines 1—1 of FIG. 2 showing one embodiment of the present invention.

In the example of FIGS. 1 and 2, the illustrated container 1 is conically shaped in the form of a cup having an upper edge 2 defining the opening lip on which a welding or sealing flange 3 is built. The shape may be cylindrical, as will be obvious to those skilled in this art. The flange 3 serves to secure a more or less rigid cover or a tear foil which may be fastened or welded in seal tight condition after the cup is filled. The flange 3 may be made of the same material as the cup and may be provided with a pressure adhesive, a thermo-adhesive or other known sealing means.

The side wall of the cup seen in FIGS. 1 and 2 is provided with three uniformly spaced, vertical reinforced ribbon or strip-like zones 4, extending from the top edge or flange 3, to the bottom. In cross section each of the reinforced zones is elliptical and gradually merges into the adjacent non-reinforced areas 5. The smooth gradual transition between the reinforced zones and the non-reinforced zones establishes a cup without any disturbingly sharp edges. While an elliptical cross section is shown, the zones may be semi-elliptical, or other compound configuration permitting, more or less, bevelling or tapering of the edges. The zones may be formed on the outer surface or on the inner surface of the wall or may extend from both surfaces, if desired.

The reinforced zones of this first embodiment extending in vertical straight strips or rails from the upper flange 3 to the bottom 6, merge with correspondingly formed ribs 7 extending radially inward toward the center of the bottom wall 6. The bottom ribs 7 may be arranged on the outer surface as well as the inner surface of the bottom, extending radially from the center to provide for a more efficient center of gravity.

Figure 3:
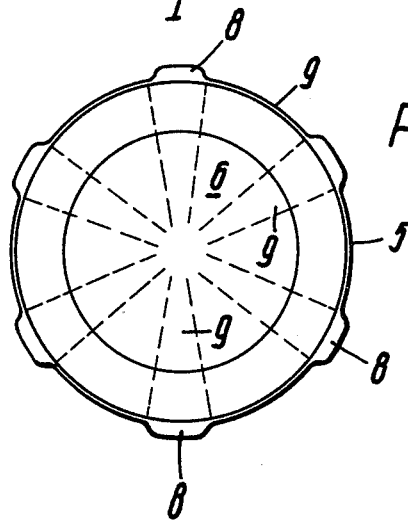
FIG. 3 is a view similar to that of FIG. 2 showing a second embodiment.

In the example of FIG. 3, the reinforced zones 8 are rectangular in cross section rather than elliptical and are formed on the outside surface of the container wall so that the inner wall of the cup has a smooth interior surface. However, even here the edges of the zones are tapered so as to provide a continuous merging of the zones with the adjacent non-reinforced area. In the embodiment six vertical zones 8 are shown, each merging with a corresponding zone 9 similarly made on the outer surface of the bottom wall. By placing the zones 9 on the outer surface they serve also, as feet for the container.

In the embodiment of FIG. 4 a similar container as is seen in FIGS. 1 and 2, is shown, having vertical reinforcing zones extending straight from the flange 3 to the bottom 6. However, here a plurality of parallel narrow circumferential or horizontal bands 10 of additional reinforced zones extend across and intersect with the vertical ones. In FIG. 5 a plurality of parallel narrow bands 11 extend at an angle to the vertical reinforced zones, also intersecting with them. The intersecting bands merge so that the flow of material is uniform, and the outer dimensions or gauge are accurate and clear.

In the embodiment of FIG. 6 a plurality of curved reinforcing zones 12 extend over the circumference of the cup wall. The curves are screw or coil like, being formed in a manner similar to an openly developed helix. It may be preferred to provide the cup with a second series of curved reinforcing zones 12a which are formed to run in an open helix in the opposite direction. The two series of zones 12 and 12a may intersect each other, or one may be formed on the outer surface and the other may be formed on the inner surface of the wall. In FIG. 7 a combination of vertical reinforcing zones 4 and curved zones 12b are shown. Here, the curved zones 12b are shown as one or more continuous helical coils wound about the circumference of the cup.

The construction of the bottom portions of the containers illustrated in FIGS. 1 and 2 can be modified or changed to forms shown in FIGS. 7 and 8. While in FIGS. 1 and 2 the reinforcing zones of the wall merge with those on the bottom, those bottom zones 13 and 14 in FIGS. 8 and 9 are radially offset. This adds a further degree of rigidity to the container. In the particular embodiment of FIG. 9 the reinforced zones are forked or separated adjacent to the peripheral edge of the bottom.

The present invention is easily adapted for the mass production of containers of any size and generally conical or cylindrical shape, requiring only a corresponding modification of the conventional molds in which they are cast to provide the reinforced zones. The injection of a plastic charge into the mold permits the simultaneous casting of the normal wall thickness and the reinforced zones, from the same material. No separate steps are required to provide the reinforcement, and since the reinforcing zones merge and gradually blend with the surrounding wall areas, the mold may be simple and very inexpensive, requiring no special part or separating lines.

All of the embodiments shown are characterized by certain similar features, among which is the fact that the reinforced zones are ribbon or strip-like, are materially less in width (i.e. peripheral width or breadth) than the non-reinforced areas, and that they are themselves non-sinuous or corrugated. Further the zones are not formed to corrugate or ripple the body of the container which is otherwise flat. The reinforced zones extend at least in part with a perpendicular component adapted to intersect the open edge or lip of the container. In the molding process the flow of material allows the plastic to proceed from the thickened portions, forming the reinforcement zones to the thinner wall areas and from the upper edge to the bottom of the container. Thus a unitary, uniform density product is obtained. The physical strength of the container is enhanced by this process since a circumferential as well as biaxial component of material flow is obtained during the molding step. The thin wall sections are very elastic and resistant to breakage while the reinforced zones provide the necessary stiffness to provide shape and cohesive bodily form providing a self-supporting container. Accordingly, containers adapted to receive hot and cold contents can be obtained with sufficient temperature stability to withstand destruction, which containers are on a par with smooth uniformly thick walled containers. As a result, a significant savings in material is obtained, even greater than 30% in comparison with uniform walled containers, when the non-reinforced areas are formed of a thickness less than one half (½) the thickness of the intermediate thin areas. Yogurt cups have been made in the embodiment shown, with normal thin areas of 0.3 mm and reinforced zones of 0.7 mm. Since the same procedures and structures are followed in the formation of the container's bottom, similar savings in material are obtained, with comparable strength and functional advantages.

Various modifications, embodiments and changes have been described, others will be obvious to those skilled in the art. Accordingly, the present disclosure is to be taken as illustrative only and not limiting of the scope of the invention.

What is claimed is:

1. A pot and adapted to contain a yoghourt product subject to refrigeration comprising a molded plastic cup shaped body having an integral bottom and a continuous conical wall terminating in an open edge, said wall being formed of a thin material having a plurality of integral circumfrentially spaced-apart strip-like reinforcing zones extending between the bottom and said edge and having at least in part a directional component intersecting said edge and the bottom edge, each of said reinforcing zones having lateral edges which smoothly taper in a continuous transition to the flat remaining areas of the wall and having a width substantially smaller than that of the intervening flat walls whereby the define thin wall sections which are elastic and resistant to breakage and circumferentially spaced-apart reinforcing zones which provide container stiffness, said flat wall having a thickness of 0.3 mm and said reinforcing zones having a thickness of 0.7 mm, said bottom being formed with corresponding radial zones which merge with said reinforcing zones.

* * * * *